3,816,564
INSULATION COATING COMPOSITIONS
Harvey Ray Holliday, Belleville, Ill., and Gary Lee Schurter, St. Louis, Mo., assignors to International Telephone and Telegraph Corporation, New York, N.Y.
No Drawing. Filed Feb. 2, 1972, Ser. No. 222,994
Int. Cl. C08f 15/00, 29/00
U.S. Cl. 260—878 R                    13 Claims

ABSTRACT OF THE DISCLOSURE

A composition is disclosed for use in providing electrical insulation. The composition is one which may be dip-coated and cured to provide superior resistance to temperature, abrasion, and to provide high electrical resistance. The compositions disclosed comprise a curable composition comprising a mixture of a polyolefin, polyvinyl chloride and a reactive allylic or vinylic compound or mixture. The composition may then be coated or applied to the electrical member and cured.

---

This invention relates to new and improved compositions for use in electrical insulating applications. More particularly, it relates to dip coating insulation compositions having superior mechanical, electrical and chemical resistance properties.

A distinct need has existed for new insulating materials that can be economically applied to electrical connectors and other conductors and which possess improved mechanical, electrical and chemical resistance properties. Previously known molded, pre-shaped rubber insulating boots and sleeves for electrical connectors have been found to be prohibitively expensive in many applications due to high mold costs and other factors. On the other hand, heretofore known plastisol coatings that can be readily applied to the connector surface have been found to be unsatisfactory in certain cases because of their tendency to flow at elevated temperatures. Such flow properties are very disadvantageous since, for example, at elevated temperatures short circuits can be produced when the plastisol coated connectors are forced against another connector or an electrical ground. Thermosetting resin coatings such as epoxide coatings have also been utilized previously but also have been found to be unsatisfactory for certain applications. Epoxide coatings, which are normally applied to the connector surface by fluidized bed techniques, have been found to present masking problems and the epoxide coatings further have been found to be brittle at low temperatures and are subject to failure on cold impact and possess unsatisfactory permeability characteristics.

In particular, a major problem has been encountered heretofore in the utility industry in providing economically advantageous, high integrity secondary bus insulations possessing the requisite physical characteristics for insulating secondary underground connectors. In this regard, it has been recognized that insulating materials for secondary underground connectors must possess properties such as volume resistivity in the order of $10^9$ ohm-cm., low heat distortion, electrical stability in a 90° C. brine solution, and resistance to cold impact. At the present time, the above properties can only be practically obtained with a molded coating. However, molded insulation has been found to present certain inherent disadvantages. For example, molded insulations are relatively expensive and lack the versatility of configuration required to solve many utility connector problems. Molded insulation usually requires a different die for each bus size and configuration, thus economics limit the number and types of buses the manufacturer of a molded insulation can offer the customer. In addition, the bare metal buses which fit into the dies must be machined to rather close tolerances for proper fit and this is economically disadvantageous.

Because of the inherent difficulties encountered with molded insulation and particularly to improve processability, attempts have been made to employ plastisol insulation coatings on secondary underground connectors. However, it has been found that the plastisol coatings do not possess the requisite physical properties such as electrical and heat distortion properties. For example, it was found that plastisol insulations were prone to fail usually due to external pressure being applied at some point on the bus coating. That is, when a bus began to heat due to the electrical load, the thermoplastic plastisol material would soften and depress at the point of pressure and subsequently a dielectric breakdown of the insulation would be encountered at that point.

It is therefore a principal object of the present invention to provide new curable compositions. In this regard, it is a further object to provide insulation coating compositions particularly suited for dip coating electrical connectors and other conductors.

Another object is to provide insulation coating compositions for use on electrical conductors where a high build coating with excellent electrical properties is required.

A further object is to provide coated electrical conductors for both underground and surface applications such as coated bus bars, coated heavy gauge wires and other electrical conductors wherein the compositions of the present invention are employed as the insulation coating material.

A still further object is to provide economically advantageous, high integrity insulation compositions having superior mechanical, electrical and chemical properties particularly for insulating secondary underground connectors.

Other objects if not specifically set forth herein will be readily apparent to those skilled in the art from the following detailed description of the invention.

The coating compositions of the present invention comprises a curable composition comprising a mixture of a polyolefin, polyvinylchloride and a reactive allylic or vinylic monomer which can be crosslinked. When cured, the compositions of this invention have been found to exhibit excellent mechanical, electrical and chemical properties when utilized as insulating coatings for electrical conductors such as electrical connectors.

We have found that the compositions of the invention can be prepared in a conventional manner by forming an intimate admixture of the polymeric components of the composition and the reactive monomer. A high temperature decomposing peroxide curing agent normally is incorporated into the mixture. Exemplary of suitable peroxides are benzoyl peroxide, hydroxyheptyl peroxide, cyclohexanone peroxides, 2,5 - dimethylhexyl-2,5-di(peroxybenzoate), di-t-butyl diperphthalate, t-butyl peracetate, t-butyl perbenzoate, dicumyl peroxide, 2,5-dimethyl-2,5-di-(t-butylperoxy) hexane, t-butyl hydroperoxide, 2,5-dimethyl-2,5-di-(t-butylperoxy) hexyne-3, di-t-butyl peroxide, methyl ethyl ketone peroxides, p-menthane hydroperoxide, and the like. The composition is subsequently applied to the surface of an object such as an electrical conductor, for example, by dipping the conductor into the composition and then withdrawing it therefrom to provide an insulation coating layer. The coated conductor is then cured to form a crosslinked insulation layer having excellent characteristics with regard to volume resistivity, heat distortion, electrical stability and resistance to cold impact. Alternatively, the composition can be cured by conventional irradiation techniques without incorporating the peroxide curing agent therein.

The polymeric components of the composition of this invention are well known and readily available. The polyolefin component includes homopolymers of alpha olefins, such as ethylene, propylene and isobutylene; copolymers of two or more such alpha olefins, such as ethylene-propylene and ethylene-butylene and copolymers. The polyvinylchloride used in the invention may be the polyvinylchloride homopolymers or a copolymerized polyvinylchloride such as copolymers of polyvinylchloride with a monomer such as vinylidenechloride, vinyl acetate and the like. Preferably, a dispersion grade polyvinylchloride homopolymer is employed, having a particle size in the range of about 0.5–50 microns and having an inherent viscosity of less than about 1.5.

In a preferred embodiment of our invention, the polyolefin component of the composition comprises a highly branched, relatively low to medium weight polyethylene having a density of about .91–.94 and most preferably about .92–.925. Polyethylene having a molecular weight in the range of about 10,000 to 1 million and having a melt index in the range of about 1 to 30 has been found to be suitable for use in the composition.

With regard to the reactive monomer to be employed in the composition, we have found that it is important to include at least one plasticizing, crosslinking allylic or vinylic monomer therein. For example, we have found that it is particularly advantageous to employ a diallyl phthalate such as diallyl isophthalate, diallyl terephthalate or diallyl orthophthalate as the reactive monomer. However, the allylic or vinylic monomer to be mixed with the above-described polymers may be any of a variety of previously known functional allylic or vinylic compounds that can be polymerized by free radical catalysis. Examples of suitable reactive allylic monomers are allyl vinyl ether, bisphenol-"A" N,N-diallylaniline, diallyl azelate, diallyl carbonate, diallyl iso-cyanurate, diallyl-1,4-cyclohexanedicarboxylate, diallyl diglycolate, N,N-diallyl-ethanolamine, diallyl ether, diallyl fumarate, diallyl glutarate, diallyl itaconate, diallyl maleate, diallyl malonate, N,N-diallylmelamine, N,N-diallylacrylamide, N,N-diallylmethacrylamide, diallyl oxalate, 2,6-diallylphenol, diallyl pimelate, N,N'-diallylpiperazine, diallyl sebacate, diallyl succinate, N-methyldiallylamine, diallyl methyltartronate, 1,3-di-(allyloxy)-2,2-(hydroxy methyl) propane, 1,4-di-(alloxy) butene-2, 1,2-di-(allyloxy) ethane, di-(2-allyloxyethyl) ether, triallyl acetyl citrate, triallyl aconitrate, triallyl cyanurate, triallyl iso-cyanurate, 1,2,3-triallyloxy-2-hydroxy-methyl propane, triallyl phosphate, triallyl trimesate, 1,1,3,3-tetraallyloxypropane, tetraallylpyromellitate, N,N,N',N'-tetraallyldiaminoethane, 1,1,2,2-tetraallyloxyethane, methallyl acrylate, and methallyl methacrylate. Exemplary of suitable reactive vinylic monomers are divinyl benzene, vinyl toluene, divinyl napthalene, divinyl diethylene glycol diether, 1,4-divinyloxybutane, and divinyl sulfone.

Additionally, it has been found to be advantageous to incorporate into the composition as an additional component thereof, a minor amount (usually less than about 10 parts and preferably about 3 to 4 parts based on 100 parts of polyolefin in the mixture) of a polyacrylate or a polymethacrylate or mixtures thereof. These materials have been found to assist in the formation of a gel structure at higher temperatures and impart further advantageous properties which enhance the dip-coating characteristics of the composition. Exemplary of suitable polyacrylates and polymethacrylates are tetraethylene glycol dimethacrylate, pentaerythritol triacrylate, pentaerythritol trimethacrylate, bisphenol-"A" dimethacrylate, 1,3-butylene diacrylate, 1,3-butylene dimethacrylate, 1,4-acrylohexanedimethyl-1,4-dimethacrylate, diethylene glycol diacrylate, diethylene glycol dimethacrylate, ethylidene diacrylate, ethylidene dimethacrylate, 1,6-hexamethylene diacrylate, 1,6-hexamethylene dimethacrylate, glyceryl triacrylate, glyceryl trimethacrylate. In this regard, it has been found that a particularly preferred polymethacrylate component of the present compositions is trimethylol propane trimethacrylate.

In the preferred embodiment of our invention, the composition is formed from a mixture comprising polyethylene, polyvinylchloride and diallyl phthalate, preferably diallyl isophthalate, and the invention is described hereinafter with reference to this embodiment.

A particularly preferred curable composition of our invention comprises (on a percent by weight basis) a mixture of about 50% polyethylene, about 5% polyvinylchloride and about 45% diallyl isophthalate. However, depending upon the particular properties desired in the curable composition and in the cured product, the percentage amount of each component to be employed may vary over a rather broad range. For example, if a relatively thick curable mixture is desired, the percentage amount of diallyl isophthalate is reduced and the percentage of polymeric components is increased. Exemplary of such a mixture would be one comprising (on a parts by weight basis) 100 parts polyethylene, 50 parts polyvinylchloride and 60 parts diallyl isophthalate. However, as the percentage amounts of polymeric components increases, a point is reached where the composition would no longer be useful for dip coatings, although the composition could have other useful applications.

In a most preferred embodiment, it has been found that excellent dip coating compositions can be produced employing about 2–10 weight percent (based on the total mixture) polyvinylchloride in conjunction with polyethylene and a reactive monomer. Additionally, we have found that it is preferable to keep the amount of diallyl phthalate in the composition below about a 1:1 ratio with the polyolefin because of the effect on the impact strength of the resulting product. However, the diallyl phthalate content of the mixture is preferred to be kept as high as possible without rendering the composition brittle because of the excellent electrical characteristics imparted to the composition by the diallyl phthalate. Also, when the ratio of diallyl phthalate to polyolefin is less than about 1:2 it has been found that the flow characteristics of the mixture are adversely affected from the standpoint of dip coating the composition although lower ratios of diallyl phthalate to polyolefin can be employed for other utilization of the compounds.

An additional component which desirably is present in the composition is a small amount of silyl peroxide (usually less than about 1.0 weight percent and preferably about 0.5 weight percent) to improve adhesion of the cured composition to metallic surfaces. Other components which may be incorporated in the composition are, for example, stabilizing agents to assume crosslinking of the polymeric components; inert fillers such as dense low oil absorption fillers including silicas, pyrites, iron oxide and other heavy metal oxides, ferrites and the like (this is particularly advantageous when the compositions of the invention are to be employed as potting or encapsulation compositions); and pigment or coloring agents such as carbon black.

We have found that without the incorporation of the polyvinylchloride component into the curable mixtures of the present invention, the resulting composition is not at all adaptable to high build (e.g., about .04 in.) dip coating applications. However, with the incorporation of polyvinylchloride, the swelling of the polyvinylchloride particles by the diallyl phthalate produces a slightly thixotropic mixture that is ideal for dip coating. In addition, the polyvinylchloride acts as a gelling agent when the mixture is coated onto a preheated object such as an electrical connector. This gel effect is particularly advantageous in preventing flow-off of the composition during cure.

In one embodiment of this invention, when a free-radical generating peroxide curing agent is introduced into a mixture comprising medium molecular weight, highly branched polyethylene, polyvinylchloride and diallyl phthalate, at temperature above about 250° F., preferably about 350–375° F., the peroxide catalyst serves two purposes: (a) on decomposition, the free radicals abstract tertiary hydrogen atoms from the branch points of the polyethylene molecule, thus generating a site for crosslinking the diallyl phthalate; and (b) the peroxide catalyst initiates polymerization of the phthalate ester. The temperature should be high enough so that the polyethylene is nearly in the molten state and sufficient molecular mobility is obtained to ensure that the radical site created by abstraction of the tertiary hydrogens can react either with the diallyl phthalate or with an adjacent polyethylene molecule containing a radical site. The resulting material has a complex, three-dimensional structure with the polyethylene being crosslinked either by reaction with the diallyl phthalate or with other polyethylene molecules. In addition, a crosslinked structure is created by homopolymerization of the diallyl phthalate.

The crosslinked structure retains some of the characteristics of both polyethylene and polydiallyl phthalate. It has toughness and retains its flexibility at low temperatures from the polyethylene while having a relatively high flow temperature under load from the polymerized diallyl phthalate. It is possible to vary these characteristics, for example, by changing the relative percent composition of the mixture or by selecting different polyethylenes and multifunctional allylic or vinylic monomers. Additionally, the amount of peroxide curing agent to be employed can be varied depending largely on the mechanical properties sought in the cured product. However, usually an amount of peroxide curing agent in the range of about 0.5–2.0 parts by weight peroxide per hundred parts of total mixture is preferred in the present compositions.

We have found that the compositions of the present invention possess excellent mechanical properties. For example, the compositions retain their structural integrity at temperatures from below −40° F. to over 225° F. Their impact strength and retention of strength at elevated temperatures are excellent and, for example, are greatly superior to vinyl plastisol compositions. When cured, the coatings will withstand high impacts at temperatures as low as −40° F. and still retain puncture and flow resistance at temperatures above 225° F. In addition, the coatings have excellent abrasion resistance, for example, one composition which was tested was found to have an abrasion rating of 30 mg./1,000 revolutions on a Taber Abraser using a very hard (CS–17) abrading wheel.

The electrical properties of the present compositions are excellent for use as electrical insulators at power frequencies and at frequencies up to the 50 mHz. range. The dielectric strength and volume resistivity are suitable for use at high voltages. The volume resistivity is in excess of $10^{11}$ ohms per cm.$^3$. The composition has sufficient chemical resistance to be used for many varied applications.

The following examples are set forth for purposes of illustration only and are not intended to be construed as being limitative in any respect.

EXAMPLE I

A mixture was prepared comprising (by weight) 47.97% polyethylene, 3.84% polyvinyl chloride, 45.56% diallyl isophthalate, 1.92% trimethylol propane dimethacrylate, and .71% 2,5-dimethyl-2,5-di-(t-butylperoxy) hexane.

The polyethylene employed in this mixture was "Microthene FN–510" a product of USI Chemicals Division of National Distillers and Chemical Corp. which is a microfine polyethylene powder having a density of 0.924, a melt index of 5 and an average particle size of less than 30 microns. The polyvinyl chloride employed in this mixture was "Geon 120 x 241" a product of B. F. Goodrich Chemical Company division of the B. F. Goodrich Co. which is a powdered, dispersion grade vinyl chloride homopolymer having a particle size such that 100% passes through a 200 mesh screen and an inherent viscosity (ASTM D1243–66) of 0.73.

The mixture was prepared by first combining the fluid components of the mixture (i.e., the diallyl isophthalate, the trimethylol propane dimethacrylate and the 2,5-dimethyl-2,5-di-(t-butylperoxy) hexane) and separately combining the powdered polyethylene and polyvinyl chloride. Then, while the fluid components were being mixed with a propeller type mixer, the combined powdered components were slowly incorporated therein a manner such that lumping and air entrapment were substantially avoided.

After all of the components were added, the mixture was mixed for an additional 30 minutes at room temperature. During this mixing period the temperature of the mixture slowly rose to about 80–85° F. and when mixing was completed a slightly viscous mixture was obtained. Then, the mixture was allowed to stand overnight to achieve thorough wetting of the powdered components.

The resulting mixture was mixed briefly and then passed through a colloid mill (at about a 20 mils gap setting) at room temperature. The temperature of the mixture coming out of the mill was about 100° F. Thereafter, the mixture was deaerated by conventional means and the mixture was allowed to cool to ambient temperature.

Then, an aluminum secondary underground bus connector which had previously been degreased and heated to 90° C. was dipped slowly into the resulting mixture. Thereafter, the bus was slowly withdrawn (no dwell time was required). It was found that a uniform coating of the aluminum surface was obtained with a build of approximately 70 mils. The coated bus was then cured in a 175° C. oven for 25 minutes.

Subsequent testing showed that the cured coating had a resistivity in excess of 50,000 megohms at 2500 volts DC. After submerging the bus in a 90° C. brine solution for 30 days and then returning it to 25° C. water, the resistivity returned to 50,000+ megohms, thus displaying excellent electrical stability. No fractures or cracks appeared in the material when the coated bus was subjected to ten (10) of the following cycles: the bus temperature was lowered to −18° C. and the bus was then dropped three (3) times from a height of four feet onto a concrete floor. This test was meant to simulate the extreme physical abuse which a bus may encounter prior to and during installation. Additionally, the heat distortion properties of this composition were found to be excellent.

EXAMPLE II

The composition of the present invention was prepared in accordance with the following formulation and this composition was used in preparing all the samples needed for determining the properties discussed below.

| Component: | Parts by weight |
|---|---|
| Polyethylene (powdered "Microthene FN–510") | 100 |
| Diallylisophthalate | 88 |
| Polyvinyl chloride ("Geon 120 x 241") | 10 |
| Trimethylolpropane trimethacrylate | 4 |
| 2,5-dimethyl-2,5-di-(t-butylperoxy)hexane | 2.5 |

In preparing the composition, the fluid components were mixed together and the powdered polyethylene and polyvinyl chloride were mixed into the fluid using a highspeed propeller type mixer. This mixture, usually in 100 or 300 g. batches, was then deaired for 15 to 20 min. at approximately 5 torr to remove all entrapped air. The mixture was then prepared, dip coated onto a preheated aluminum surface and cured in a manner similar to that employed in Example I. The resulting dip coated conductor was subjected to testing to determine the mechanical, thermal, electrical and chemical properties of the cured insulation coating composition. The results of this testing were as follows:

(1) Mechanical properties (a) Compressive strength properties at various temperatures were determined by ASTM Method D695–63T at five temperatures (average of seven specimens):

| Temperature, °F.: | Modulus of elasticity in compression, $E_c$ (p.s.i.) | Compressive strength at 10% deflection (p.s.i.) |
|---|---|---|
| 70 | 32,360 | 2,240 |
| 125 | 19,480 | 1,620 |
| 175 | 10,480 | 934 |
| 225 | 4,070 | 411 |
| 250 | 3,280 | 354 |

(b) Flexural properties were determined by ASTM Method D790–63, at 70° F. (average of seven specimens):

| Flexural strength (p.s.i.) | Modulus of elasticity in flexure, $E_B$ (p.s.i.) |
|---|---|
| 4,3000 | 99,190 |

(c) Tensile properties were determined by ASTM Method D638–61T at 70° F. (average of seven specimens):

| Tensile strength (p.s.i.): | Tensile modulus of elasticity, $E_T$ (p.s.i.) |
|---|---|
| 2,618 | 23,880 |

(d) Abrasion resistance was determined by Federal Specification TT–P–141b, method 619.2 "Abrasion Resistance (Taber)": Duplicate samples of 0.040 in. thick coating on an aluminum substrate gave the following rate loss using a CS–17 (very hard) abrasion wheel:

| | Mg./—1,000 revolutions |
|---|---|
| Sample No. 1 | 31.5 |
| Sample No. 2 | 28.0 |
| Average | 29.8 |

It should be noted that this rate of abrasion is outstanding. Even the best of protective coatings usually exceeds 50 mg./1,000 revolutions in the same test.

(2) Thermal properties

Of particular interest is the heat and cold resistance of the composition. The effect of temperature on the compressive strength indicated that the composition of the invention will withstand appreciable loads at temperatures up to 225° F. The thermal softening point as determined by a modified ASTM D1525–65T "Vicate Softening Point of Plastics" was 240–248° F.

A heat distortion test (IPCEA 5–61–402, NEMA WC5–1961) was also conducted utilizing a Randall-Stickney instrument with a 2000 gram gauge load. The distortion was determined to be 3.7%. This same test conducted on a sample of crosslinked polyethylene cable insulation revealed a 14.5% distortion. It thus appears that this formulation has excellent properties for use as a connector insulator when elevated operating temperatures are encountered.

Another important factor is resistance of the coating to impact at low temperatures. A 0.06 in. coating of the cured material bonded to ⅛ in. thick aluminum showed no cracking, spalling or other failure when subjected to impacts of a blunt-tipped 2-lb. weight falling 28 in. at temperatures down to —40° F. (Gardner Impact Tester).

(3) Electrical properties

The most important electrical properties are the insulation resistance and dielectric strength. It has been found that the dielectric strength of the present insulation coating composition is at least 1500 v./mil on a 20 mil specimen. Additionally, the following electrical properties were determined:

(a) Dielectric constant, $e'$:
(1) By Wayne-Kerr Bridge _____ 3.5
(2) By Boonton RX Meter _____ 3.4

(b) Loss factor, $e''$, at:
(1) 25 mHz. _____ <0.005
(2) 50 mHz. _____ 0.009
(3) 100 mHz. _____ 0.018

(c) Volume resistivity: This property was determined by two measurement techniques, the Wayne-Kerr Impedance Bridge and by direct measurement using a Kiethyl Model 602 Electrometer. The following volume resistivities were obtained:

(1) Wayne-Kerr (1,500 kHz.): $4.82 \times 10^{11}$ ohm-cm.
(2) Kiethyl 602 Electrometer: $1.93 \times 10^{11}$ ohm-cm.

(d) Surface resistivity: This value was determined using the ASTM D257 guarded electrode specimen. As above, the resistance measurement was made with the Kiethyl 602 Electrometer. The surface resistance was found to be $1.49 \times 10^{11}$ ohm/sq.

(4) Solvent resistance

Eleven different solvents were selected for evaluation. Test specimens of cast and cured coating material (approximately 1 x 0.5 x 0.25 in.) were carefully measured to calculate volume and weighed to the nearest milligram. These specimens were then immersed in the solvents for 6 days at 120° F. The following weight and volume changes were found:

| Solvent | Percent Weight change | Vol. change |
|---|---|---|
| Water | +0.23 | 0.00 |
| 5% HCl | +0.23 | +0.34 |
| 5% NaOH | +0.22 | —0.82 |
| No. 1 fuel oil | +6.82 | +8.59 |
| Toluene | +25.23 | +32.45 |
| Perchloroethylene | +54.67 | +37.39 |
| Liquid detergent ("Mr. Clean") | +0.69 | —0.22 |
| Ethanol | +0.87 | +0.63 |
| Methylisobutylketone | +6.38 | +7.42 |
| 10% NaCl | +0.22 | —0.39 |
| Acetone | +6.17 | +6.47 |

EXAMPLE III

A composition was prepared as in Example II except that silyl peroxide was incorporated into the coating formulation in an amount of 0.5 weight percent. When this formulation was cured at 350° F. onto a degreased and chromic acid etched or sodium carbonate cleaned aluminum plate, excellent adhesion was observed. Three inch square, ¹⁄₁₆ in. thick aluminum sheets were coated with approximately 60 ml. of the formulation. After curing, the coating would withstand a 90-degree bend without loss of adhesion or fracture. The samples were chilled to —40° F. and subjected to repeated impact (2 lb. x 28 in.) using the Gardner Impactor on both the coated and reverse sides. No loss of adhesion, cracking or chipping of the coating was observed. The lap shear strength of the formulation was found to be 2,850 p.s.i. when used as an adhesive on cleaned aluminum.

Obviously, many modifications and variations of the invention as hereinbefore set forth may be made without departing from the spirit and scope thereof. Therefore, only such limitations should be imposed as are indicated in the appended claims.

We claim:
1. A curable composition comprising a mixture of polyolefin, polyvinyl chloride and from about 50 to 100 parts per 100 parts of polyolefin of a reactive monomer selected from the group consisting of allylic and vinylic compounds and mixtures thereof.

2. The curable composition of claim 1 including a peroxide curing agent.

3. The curable composition of claim 2 wherein said polyolefin is polyethylene.

4. The curable composition of claim 3 wherein said polyethylene is a highly branched, low to medium molecular weight polyethylene having a molecular weight between 10,000 and 1 million, a density of about .91–.94 and a melt index in the range of about 1 to 30.

5. The curable composition of claim 1 wherein said polyvinyl chloride is selected from the group consisting of polyvinyl chloride homopolymers, copolymers of polyvinyl chloride and mixtures thereof.

6. The curable composition of claim 5 wherein said copolymers of polyvinyl chloride are copolymers of polyvinyl chloride with a monomer selected from the group consisting of vinylidene chloride, vinyl acetate and mixtures thereof.

7. The curable composition of claim 2 wherein said reactive monomer is diallyl phthalate.

8. The curable composition of claim 2 including a compound selected from the group consisting of polyacrylates, polymethacrylates and mixtures thereof.

9. The curable composition of claim 8 wherein said polymethacrylate is trimethylol propane trimethacrylate.

10. The curable composition of claim 2 including silyl peroxide.

11. A curable composition comprising a mixture of polyolefin, from 2–10% by weight of the composition of polyvinyl chloride, from about 50 to 100 parts per 100 parts of polyolefin of diallyl phthalate and a peroxide curing agent.

12. The curable composition of claim 11 wherein said polyethylene is a highly branched, low to medium molecular weight, polyethylene having a molecular weight between 10,000 and 1 million, a density of about .91–.94 and a melt index in the range of about 1 to 30.

13. The curable composition of claim 11 including trimethylol propane trimethacrylate.

References Cited

UNITED STATES PATENTS

| | | | |
|---|---|---|---|
| 3,639,529 | 2/1972 | MacKenzie, Jr. et al. | 260—94.9 GA |
| 3,631,161 | 12/1971 | Fan et al. | 260—94.9 GA |
| 3,111,500 | 11/1963 | Bartl et al. | 260—878 R |
| 3,496,253 | 2/1970 | Hamilton et al. | 260—884 |

OTHER REFERENCES

*Webster's New World Dictionary, College Edition*, p. 885, World Publishing Co., New York (1966).

JOSEPH L. SCHOFER, Primary Examiner

A. HOLLER, Assistant Examiner

U.S. Cl. X.R.

260—884